United States Patent
Kaplan et al.

(10) Patent No.: US 12,037,489 B2
(45) Date of Patent: Jul. 16, 2024

(54) POLYOL BLENDS AND RIGID FOAMS WITH IMPROVED LOW-TEMPERATURE R-VALUES

(71) Applicant: STEPAN COMPANY, Northbrook, IL (US)

(72) Inventors: Warren A. Kaplan, Libertyville, IL (US); Zhenhua Cui, Chesterbrook, PA (US); Sarah Wolek, Arlington Heights, IL (US)

(73) Assignee: STEPAN COMPANY, Northfield, IL (US)

( * ) Notice: Subject to any disclaimer, the term of this patent is extended or adjusted under 35 U.S.C. 154(b) by 0 days.

(21) Appl. No.: 18/144,777

(22) Filed: May 8, 2023

(65) Prior Publication Data

US 2023/0272212 A1   Aug. 31, 2023

Related U.S. Application Data

(60) Division of application No. 17/066,741, filed on Oct. 9, 2020, which is a continuation of application No. PCT/US2019/026253, filed on Apr. 8, 2019.

(60) Provisional application No. 62/655,471, filed on Apr. 10, 2018.

(51) Int. Cl.
| C08J 9/14 | (2006.01) |
| C08G 18/42 | (2006.01) |
| C08G 18/73 | (2006.01) |
| C08L 67/03 | (2006.01) |

(52) U.S. Cl.
CPC .......... *C08L 67/03* (2013.01); *C08G 18/4263* (2013.01); *C08G 18/73* (2013.01); *C08J 9/141* (2013.01); *C08G 2110/0025* (2021.01); *C08J 2203/14* (2013.01); *C08J 2203/182* (2013.01); *C08J 2205/10* (2013.01); *C08L 2205/025* (2013.01); *C08L 2205/03* (2013.01)

(58) Field of Classification Search
CPC ........... C08G 18/36; C08G 18/4018; C08G 18/4211; C08G 18/4263; C08G 18/4288; C08G 18/6603; C08G 18/73; C08G 18/7664; C08G 2110/0025; C08J 9/141; C08J 9/142; C08J 2203/14; C08J 2203/182; C08J 2205/10; C08L 67/03; C08L 2205/025; C08L 2205/03
See application file for complete search history.

(56) References Cited

U.S. PATENT DOCUMENTS

| 4,608,432 A | 8/1986 | Magnus |
| 4,644,027 A | 2/1987 | Magnus |
| 4,644,048 A | 2/1987 | Magnus |
| 4,722,803 A | 2/1988 | Magnus |
| 5,922,779 A | 7/1999 | Hickey |
| 6,359,022 B1 | 3/2002 | Hickey |
| 10,428,170 B1 | 10/2019 | Singh |
| 2003/0118761 A1 | 6/2003 | Triebes |
| 2003/0232956 A1 | 12/2003 | Brinkman |
| 2004/0126564 A1 | 7/2004 | Thornsberry |
| 2010/0240785 A1 | 9/2010 | Hickey |
| 2011/0028581 A1 | 2/2011 | Gnedin |
| 2011/0201716 A1 | 8/2011 | Gehinger |
| 2013/0090399 A1 | 4/2013 | Hickey |
| 2013/0241098 A1 | 9/2013 | Anjum |
| 2013/0324626 A1 | 12/2013 | Fabisiak |
| 2016/0002386 A1 | 1/2016 | Wolek |
| 2016/0053058 A1 | 2/2016 | Tabor |
| 2019/0233571 A1 | 8/2019 | Diendorf |

FOREIGN PATENT DOCUMENTS

| CA | 2885227 A1 * | 4/2014 | .......... C08G 18/225 |
| CN | 101039977 A | 9/2007 | |
| CN | 102300892 A | 12/2011 | |
| CN | 104520346 A | 4/2015 | |
| CN | 104854156 A | 8/2015 | |
| CN | 105980438 A | 9/2016 | |
| EP | 3774983 | 2/2021 | |
| JP | 5186678 A | 4/1978 | |
| JP | 3467370 B2 | 11/2003 | |
| JP | 2004075982 | 3/2004 | |
| JP | 2005514238 | 5/2005 | |
| JP | 2007051280 | 3/2007 | |
| JP | 4772028 B2 | 9/2011 | |
| JP | 2012505941 | 3/2012 | |
| JP | 2015512453 | 4/2015 | |
| JP | 2019518855 | 7/2019 | |
| WO | 2009156457 A1 | 12/2009 | |
| WO | 2012006282 A1 | 1/2012 | |

(Continued)

OTHER PUBLICATIONS

International Search Report issued in International Application No. PCT/US2019/026253, Issued Jul. 10, 2019, 3 pages.

Letts et al., "Improving Polyiso Thermal Performance at Low Temperature", Thermal Performance of the Exterior Envelopes of Whole Buildings XIII International Conference, © 2016 ASHRAE, pp. 59-67.

Singh et al., "Low Temperature Thermal Performance of Polyisocyanurate Insulation", © 2017 American Chemistry Council, 16 pages.

Sterna et al., Proceedings of the Latvian Academy of Sciences, 1985. No. 9 (458), 116-121.

Chinese Office Action (with English translation) for App. No. CN201980036072.2, dated Nov. 29, 2021, 17 pages.

(Continued)

*Primary Examiner* — John M Cooney
(74) *Attorney, Agent, or Firm* — DILWORTH IP, LLC

(57) ABSTRACT

A rigid PU or PU-PIR foam comprising a reaction product of water, a catalyst, a foam-stabilizing surfactant, a polyisocyanate, a blowing agent and a blend comprising:
(a) 90 to 99 wt. % of an aromatic polyester polyol having a hydroxyl number within the range of 150 to 400 mg KOH/g; and (b) 1 to 10 wt. % of a fatty acid derivative selected from the group consisting of $C_8$ to $C_{18}$ fatty acid esters and $C_8$ to $C_{18}$ fatty acid amides.

13 Claims, 1 Drawing Sheet

(56) References Cited

FOREIGN PATENT DOCUMENTS

| WO | 2013127959 A1 | 9/2013 |
| WO | 2017100104 A1 | 6/2017 |
| WO | 2017220332 | 12/2017 |

OTHER PUBLICATIONS

Aydin, Ahmet Alpe, "Polyurethane rigid foam composites incorporated with fatty acid estere-based phase change material", Energy Conversion and Management, 68, 74-81, Apr. 30, 2013.
Xinmin Liu et al., "Study of the Rigid Polyurethane Foam for Sandwich Panel", Modern Plastics Processing and Application, vol. 16, Issue 1, Feb. 29, 2004.
Office Action (Non-Final Rejection) dated Jun. 23, 2022 for U.S. Appl. No. 17/066,741 (pp. 1-4).
Office Action (Final Rejection) dated Dec. 20, 2022 for U.S. Appl. No. 17/066,741 (pp. 1-5).
English translation of Japanese Office Action issued in App. No. JP2020-555373, dated Jan. 24, 2023, 3 pages.
Office Action (Non-Final Rejection) dated Mar. 27, 2023 for U.S. Appl. No. 17/066,741 (pp. 1-6).
Chinese Office Action (with English translation) issued in App. No. CN201980036072.2, dated Apr. 26, 2022, 12 pages.
Chinese Office Action (with English translation) issued in App. No. CN201980036072.2, dated Jul. 7, 2022, 8 pages.

\* cited by examiner

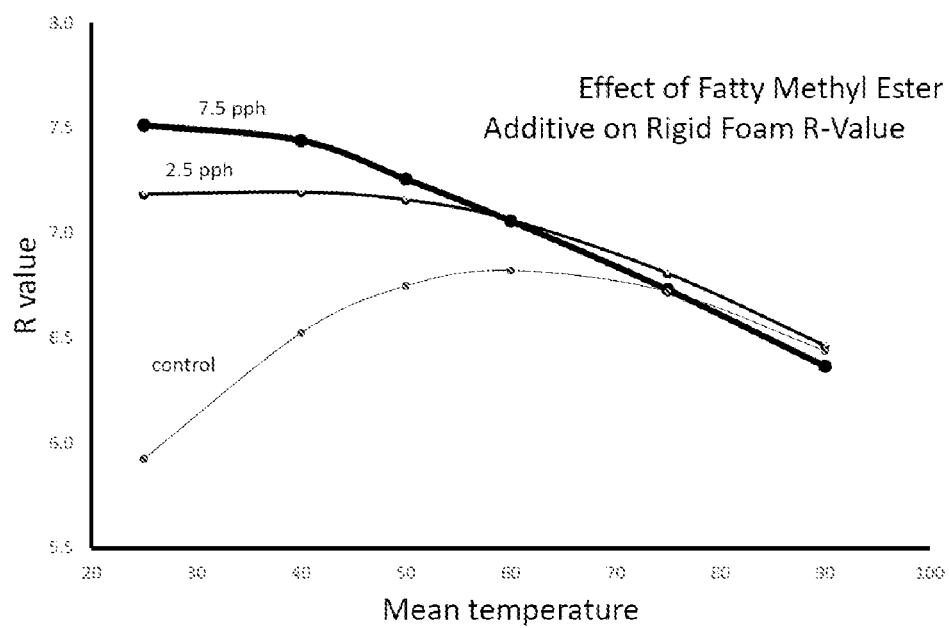

POLYOL BLENDS AND RIGID FOAMS WITH IMPROVED LOW-TEMPERATURE R-VALUES

FIELD OF THE INVENTION

The invention relates to aromatic polyester polyol blends and rigid foams produced from the blends.

BACKGROUND OF THE INVENTION

Rigid polyurethane (PU) or polyurethane-modified polyisocyanurate (PU-PIR) spray foams and foam boards are widely used to insulate (among other things) roofs, walls, pipes, and appliances. One measure of insulation performance is "R-value," which relates to the capacity of an insulating material to resist heat flow, with higher values indicating greater insulating power. The R-value of a PU or PU-PIR foam should improve as the mean temperature of the evaluated temperature gradient is reduced. Historically, this has been true for prior-generation blowing agents such as CFCs, HCFCs, and the like. Unfortunately, however, PU-PIR foam blown with pentane isomers or mixtures thereof do not completely follow this trend. In fact, a reduced R-value is often observed as the mean temperature is lowered from 75° F. to 40° F.

Fatty acid derivatives, such as fatty acid esters and fatty acid amides, are obtained from fats and oils. They are commonly used as solvents, detergents, fuel components, and as ingredients for personal care applications. Fatty acid derivatives have sometimes been used as hydrophobic reactants for making polyols for urethane applications (see, e.g., U.S. Pat. Nos. 4,608,432; 4,644,048; and 5,922,779). However, simple blends of fatty acid derivatives and aromatic polyester polyols have apparently not been used in the production of rigid PU or PU-PIR foams.

Environmental regulations related to ozone depletion and global warming concerns have induced a thorough evaluation of blowing agents used by the rigid polyurethane foam insulation industry. Halogenated blowing agents (HCFCs, HFCs, HFOs, etc.) effectively insulate foams at lower and higher temperature, but they tend to be costly or have other drawbacks when compared to low-boiling hydrocarbon blowing agents. Within the polyisocyanurate insulation board industry over the past decade, pentanes have become preferred blowing agents. A disadvantage of pentane isomers as blowing agents for rigid PU-PIR foam is a decline in insulation performance observed at low temperature. Ideally, PU-PIR foam would provide consistent and excellent insulation characteristics in both warm and cold climates, regardless of day- or night-time temperature variation. The industry would therefore benefit from ways to modify current pentane-blown rigid foam to provide improved insulation performance at lower temperature.

SUMMARY OF THE INVENTION

In one aspect, the invention relates to a blend comprising an aromatic polyester polyol and a fatty acid derivative. The blend comprises 90 to 99 wt. % of the aromatic polyester polyol and 1 to 10 wt. % of a fatty acid derivative selected from the group consisting of $C_8$ to $C_{18}$ fatty acid esters and $C_8$ to $C_{18}$ fatty acid amides. The polyester polyol has a hydroxyl number within the range of 150 to 400 mg KOH/g.

The invention includes rigid PU or PU-PIR foams that comprise a reaction product of water, a catalyst, a foam-stabilizing surfactant, a polyisocyanate, a blowing agent, and the polyester polyol/fatty acid derivative blends. In preferred aspects, the blowing agent is n-pentane, isopentane, cyclopentane, or a mixture thereof.

We surprisingly found that low-temperature R-values of rigid foams, particularly pentane-blown foams, can be improved significantly by using blends of aromatic polyester polyols and a minor proportion of readily available fatty acid derivatives. In some aspects, the initial R-value of the foam measured at 40° F. meets or exceeds that measured at 75° F. In other aspects, the difference between initial R-values of the foam measured at 75° F. and 40° F. is at least 5% greater than that of a similar foam prepared in the absence of the fatty acid derivative.

BRIEF DESCRIPTION OF THE DRAWING

FIG. 1 is a plot of initial R-values versus mean temperature for rigid foams made using STEPANPOL® PS-2352 polyester polyol and 2.5 to 7.5 wt. % of STEPOSOL® C-65 fatty methyl ester additive (data from Table 5). The blowing agent is 50% isopentane/50% n-pentane.

DETAILED DESCRIPTION OF THE INVENTION

A. Aromatic Polyester Polyol Blends

In one aspect, the invention relates to a blend comprising an aromatic polyester polyol and a fatty acid derivative. As used herein, "blend" means an unreacted mixture of components. Preferably, the blend is also clear and homogeneous.

1. Aromatic Polyester Polyol

The polyol blends include an aromatic polyester polyol. Suitable aromatic polyester polyols are well known, and many are commercially available. The polyester polyols can be produced from aromatic dicarboxylic acids or their derivatives, especially one or more phthalate-based compounds or compositions (e.g., terephthalic acid, dimethyl terephthalate, DMT bottoms, phthalic anhydride, isophthalic acid, and the like) and one or more glycols (e.g., ethylene glycol, diethylene glycol, triethylene glycol, propylene glycol, dipropylene glycol, 1,3-propanediol, 2-methyl-1,3-propanediol, glycerin, trimethylolpropane, and the like), optionally with some aliphatic dicarboxylic acid (e.g., adipic acid, succinic acid) content. In one preferred aspect, the aromatic polyester polyol comprises recurring units from phthalic anhydride and diethylene glycol.

Commercially available aromatic polyester polyols include products available from Stepan Company under the STEPANPOL® mark, particularly the STEPANPOL® PS-series of products, such as STEPANPOL® PS-1812, STEPANPOL® PS-1912, STEPANPOL® PS-1952, STEPANPOL® PS-2002, STEPANPOL® PS-2080, STEPANPOL® PS-2352, STEPANPOL® PS-2412, STEPANPOL® PS-2520, STEPANPOL® PS-2602, STEPANPOL® PS-3021, STEPANPOL® PS-3422, STEPANPOL® PS-3524, and the like. Suitable aromatic polyester polyols are also available from Huntsman (TEROL® polyols) and INVISTA (TERATE® polyols).

The aromatic polyester polyols have hydroxyl numbers, as measured by ASTM E-222, within the range of 150 to 400 mg KOH/g, from 160 to 350 mg KOH/g, or in some aspects from 200 to 300 mg KOH/g, or from 230 to 250 mg KOH/g. The polyols have, in some aspects, number-average molecular weights from 280 to 1100 g/mol, or from 300 to 700 g/mol. The aromatic polyester polyols preferably have acid values less than 5 mg KOH/g, or less than 2 mg KOH/g, or less than 1 mg KOH/g. The polyols have viscosities less than 25,000 cP at 25° C., less than 10,000 cP at 25° C., or less than 5,000 cP at 25° C. In some aspects, the viscosities are within the range of 100 cP to 10,000 cP at 25° C. or from 500 cP to 5,000 cP at 25° C.

In some aspects, the aromatic polyester polyol/fatty acid derivative blend includes 0.5 to 15 wt. % based on the amount of aromatic polyester polyol, preferably 1 to 10 wt. %, of a nonionic alkoxylated surfactant. In these aspects, the surfactant is included as a blend component. Including the nonionic surfactant can, in some cases, help to ensure a clear, homogeneous mixture of B-side components. Suitable nonionic alkoxylated surfactants include, for example, alkoxylated alkylphenols and fatty alcohol alkoxylates, especially alkylphenol ethoxylates and fatty alcohol ethoxylates. Other suitable nonionic alkoxylated surfactants are described in U.S. Pat. No. 5,922,779, the teachings of which are incorporated herein by reference.

In some aspects, the aromatic polyester polyol is partially transesterified with 0.1 to 20 wt. % based on the amount of aromatic polyester polyol, preferably 0.2 to 10 wt. %, of a hydrophobe as is known in the art (see U.S. Pat. Nos. 4,608,432; 4,644,027; 4,644,048; 4,722,803; and 5,922,779, the teachings of which are incorporated herein by reference). In these aspects, the aromatic polyester polyol is a reaction product of an aromatic dicarboxylic acid or derivative, one or more glycols, and the hydrophobe. These aromatic polyester polyols are collectively known as "self-compatibilizing polyols." The hydrophobe helps to ensure a homogeneous mixture when "B-side" components of the rigid foam formulation—particularly the aromatic polyester polyol, the fatty acid derivative, any other polyols, water, surfactants, catalysts, fire retardant, and the blowing agent—are combined and mixed prior to their combination with the polyisocyanate.

Suitable partially transesterified hydrophobes contain one or more substantially non-polar moieties, are substantially water insoluble, and generally include at least one carboxylic acid group, carboxylic ester group, or hydroxyl group. Suitable hydrophobes include fatty acids, fatty acid esters, triglycerides (e.g., fats and natural oils), fatty alcohols, alkylphenols, and the like. Fatty acids include, for instance, caproic acid, caprylic acid, capric acid, lauric acid, myristic acid, palmitic acid, stearic acid, oleic acid, linoleic acid, ricinoleic acid, and the like, and mixtures thereof. Fatty acid esters include, e.g., fatty methyl esters such as methyl laurate, methyl palmitate, methyl oleate, and the like. Fatty alcohols include, e.g., decyl alcohol, oleyl alcohol, dodecyl alcohol, tridecyl alcohol, and the like. Natural oils include, e.g., soybean oil, sunflower oil, castor oil, corn oil, olive oil, palm oil, tall oil, tallow, and the like. Alkylphenols include, e.g., octylphenols, nonylphenols, decylphenols, dodecylphenols, and the like. Whether or not using a self-compatibilizing polyol will be advantageous depends on many factors, including the nature of the aromatic polyester polyol, the nature of the fatty acid derivative, the relative proportion of these, the nature and amount of blowing agent, and other factors that are within the skilled person's discretion.

Other aromatic polyester polyols can be included in the blends. For more examples of suitable aromatic polyester polyols, see U.S. Pat. Nos. 6,359,022, 5,922,779, 4,608,432, 4,644,048, and 4,722,803, the teachings of which are incorporated herein by reference.

In some aspects, it may be desirable to include other polyol types with the aromatic polyester polyols. Examples include thioether polyols; polyester amides, polyacetals, and aliphatic polycarbonates containing hydroxyl groups; amine-terminated polyethers;

amine-initiated polyols; polyether polyols; Mannich polyols; non-aromatic polyester polyols; graft dispersion polyols; polyetherester polyols, and mixtures thereof.

2. Fatty Acid Derivative

The polyol blends include a fatty acid derivative. Suitable fatty acid derivatives for the blends include esters of $C_8$ to $C_{18}$ fatty acids ("fatty esters") and amides of $C_8$ to $C_{18}$ fatty acids ("fatty amides"). Mixtures of the fatty esters and the fatty amides can be used. Suitable fatty esters and fatty amides are well known. They can be synthesized from naturally occurring fats and oils by known processes. Many are commercially available from Stepan Company and other suppliers.

Fatty alkyl esters, particularly fatty esters from $C_8$ to $C_{18}$ fatty acids and $C_1$ to $C_6$ alcohols, and more particularly fatty methyl esters, are readily available and are preferred in some aspects. Examples include methyl soyates, methyl oleates, methyl ricinoleates (from castor oil), methyl palmitates, methyl myristates, methyl laurates, ethyl soyates, isopropyl palmitates, isopropyl myristates, hexyl laurates, and the like.

In some aspects, esters from $C_8$ to $C_{18}$ fatty acids and sugar-based alcohols can be used. Examples include sorbitan monooleate, sucrose monooleate, sucrose monolaurate, sorbitan monolaurate, sorbitan monomyristate, and the like.

Commercially available fatty methyl esters include, for instance, esters available under the STEPOSOL® mark such as STEPOSOL® C-25 (methyl caprate/methyl caprylate mixture, $C_8$-$C_{10}$), STEPOSOL® C-42 (methyl laurate/methyl myristate mixture, $C_{12}$-$C_{14}$), STEPOSOL® C-48 (methyl laurate, $C_{12}$), and STEPOSOL® C-65 (methyl palmitate/methyl stearate/methyl oleate mixture, $C_{16}$-$C_{18}$).

Suitable $C_8$ to $C_{18}$ fatty acid esters also include diesters produced from polyethylene glycols. In preferred diesters, the central PEG portion has a molecular weight within the range of 200 to 2,000 g/mol or from 250 to 1,000 g/mol. The PEG diesters are easily synthesized by well-known methods from the corresponding polyethylene glycols and $C_8$ to $C_{18}$ fatty acids (or suitable fatty acid derivative, including triglycerides). Examples include PEG-400 dioleate, PEG-600 dioleate, PEG-400 diricinoleate, PEG-400 diisostearate, PEG-400 dilaurate, PEG-400 disoyate, PEG-600 dilaurate, and the like. Some PEG diesters are commercially available from Oleon (under the RADIASURF™ mark), Hallstar (under the HALLSTAR® mark), or other suppliers.

Suitable fatty amides are nominally reaction products of ammonia or amines, especially secondary amines such as dimethylamine or diethylamine, with $C_8$ to $C_{18}$ fatty acids (or suitable fatty acid derivatives, including triglycerides). The amines preferably have $C_1$-$C_{10}$ alkyl groups. In some aspects, the fatty amides are N,N-dialkylamides, preferably N,N-dimethylamides, of $C_8$ to $C_{18}$ fatty acids. Examples include N,N-dimethyl lauramide, N,N-diethyl lauramide, N,N-dimethyl myristamide, N,N-dimethyl cocamide, N,N-dimethyl palmitamide, and the like. Commercially available fatty amides include, for instance, amides available from Stepan under the HALLCOMID® mark such as HALLCOMID® M8-10, HALLCOMID® M10, and HALLCOMID® M12-14. Fatty amides are also available from Kao Chemicals, Croda, and other suppliers.

The fatty acid derivative is used in an amount within the range of 1 to 10 wt. % based on the amount of aromatic polyester polyol blend. In preferred aspects, the fatty acid derivative is used in amounts from 2 to 8 wt. % or from 2.5 to 7.5 wt. % based on the amount of aromatic polyester polyol blend.

The inventive blends can be made by mixing, in any order and using any desired means, the aromatic polyester polyol and the fatty acid derivative. Typically, the polyol and fatty acid derivative are simply combined and mixed at 20° C. to 65° C. until a homogeneous mixture is obtained. Inclusion of the nonionic alkoxylated surfactant may be helpful in achieving good homogeneity.

B. Rigid Foam Formulations

The aromatic polyester polyol blends are useful for making rigid polyurethane (PU) and polyurethane-modified polyisocyanurate (PU-PIR) foams. The foams are reaction products of water, a catalyst, a foam-stabilizing surfactant, a polyisocyanate, a blowing agent, and the inventive polyester polyol/fatty acid derivative blends.

1. Water

Rigid PU and PU-PIR foams produced according to the invention include water as a reactant. The amount of water used depends on several factors, including the amount of polyisocyanate, the desired index, the nature and amount of the polyester polyol, the nature and amount of the fatty acid derivative, which catalysts, surfactants, and blowing agents are used, and other factors. Generally, the water is used in an amount within the range of 0.1 to 3 wt. %, 0.2 to 1 wt. %, or 0.3 to 0.7 wt. % based on the amount of polyester polyol in the rigid foam formulation.

2. Catalyst

Catalysts suitable for use include compounds that catalyze the reaction of isocyanates and water ("blowing catalysts") and compounds that catalyze the formation of urethane, urea, or isocyanurate linkages ("PU catalysts," "PIR catalysts," or "trimerization catalysts").

Amine catalysts are generally tertiary amines or alkanolamines and their mixtures with a diluent, typically a glycol such as dipropylene glycol. Examples include bis(2-dimethylaminoethyl)ether, N,N-dimethylaminopropylamine, N,N-dimethylethanolamine, triethylenediamine, benzyldimethylamine, N,N-dimethylcyclohexylamine, N,N,N',N',N"-pentamethyldiethylenetriamine, diethanolamine, N-ethylmorpholine, N,N,N'N'-tetramethylbutanediamine, 1,4-diaza[2.2.2]bicyclooctane, and the like, and combinations thereof. Examples include POLYCAT® 5 or POLYCAT® 8 (Evonik) and NIAX® A-1 or NIAX® A-99 (Momentive).

Other catalysts include carboxylates (e.g., potassium acetate, potassium octoate), organotin compounds (e.g., dibutyltin dilaurate, stannous octoate), quaternary ammonium compounds (e.g., N-(2-hydroxyethyl)trimethylammonium chloride), and the like, and combinations thereof.

Suitable catalysts are available from Evonik (TEGOAMIN® amine catalysts, KOSMOS® metal catalysts, DABCO® TMR catalysts, DABCO® K-15 catalysts, and POLYCAT® catalysts), Huntsman (JEFFCAT® catalysts), King Industries (K-KAT® catalysts), Momentive (NIAX® catalysts), Galata Chemicals (FOMREZ® organotin catalysts), and others.

3. Foam-Stabilizing Surfactant

Foam-stabilizing surfactants suitable for use in making the PU and PU-PIR foams are well known. Examples include products available commercially from Evonik, Dow Chemical, Siltech, Momentive Performance Materials, and others. Thus, suitable foam-stabilizing surfactants include TEGOSTAB® B silicone surfactants (Evonik), SILSTAB® silicone surfactants (Siltech), VORASURF™ surfactants (Dow), NIAX® surfactants (Momentive) and others. Many suitable foam-stabilizing surfactants are polysiloxanes or other silicon-based surfactants. In general, the surfactant should help to enable the production of a closed-cell rigid foam.

4. Blowing Agent

Blowing agents suitable for use are well known and include aliphatic or cycloaliphatic $C_4$-$C_6$ hydrocarbons, water, mono- and polycarboxylic acids and their salts, tertiary alcohols, chlorofluorocarbons (CFCs), hydrochlorofluorocarbons (HCFCs), halogenated hydrocarbons, hydrofluoroolefins (HFOs), and the like, and their mixtures. For further examples of suitable blowing agents, see U.S. Pat. No. 6,359,022, the teachings of which are incorporated herein by reference.

Pentane blowing agents, i.e., n-pentane, isopentane, cyclopentane, and mixtures thereof are preferred. In fact, we found that inclusion of the fatty acid derivative enables broad range insulation capability by boosting low-temperature R-values. In terms of low-temperature R-values, cyclopentane appears to be most effective among C5 blowing agents in achieving higher values. However, cyclopentane may be more expensive than n-pentane or isopentane and may adversely impact dimensional stability of the foam, so there may be trade-offs in cost and performance. The particular C5 blowing agent (or combination) and amount preferred for use will depend on many factors, including overall cost, desired foam density, properties of the foam, processing considerations, and other factors that are within the skilled person's discretion.

5. Polyisocyanate

Polyisocyanates suitable for use are well known, and many are commercially available from Dow Chemical (under the PAPI™, ISONATE®, and VORONATE™ marks), Evonik (VESTANAT®), BASF (LUPRANATE®), Covestro (MONDUR® and DESMODUR®), Huntsman (RUBINATE®), and other suppliers of polyurethane intermediates. Polyisocyanates suitable for use have average NCO functionalities within the range of 2.0 to 3.0. The polyisocyanate can be aromatic or aliphatic. Aromatic polyisocyanates include, e.g., toluene diisocyanates (TDI), 4,4'-diphenylmethane diisocyanates (MDI), or polymeric diisocyanates (p-MDI), or the like. Aliphatic polyisocyanates include, e.g., hexamethylene diisocyanate (HDI), hydrogenated MDI, cyclohexane diisocyanate (CHDI), isophorone diisocyanate (IPDI), trimethyl or tetramethylhexamethylene diisocyanate (TMXDI), or the like. Aromatic polyisocyanates, especially polymeric MD's having NCO functionalities within the range of 2.3 to 3.0, are preferred. Suitable polymeric MD's include, for instance, LUPRANATE® M-10 (average NCO functionality=2.3) and LUPRANATE® M-20 (average NCO functionality=2.7), products of BASF as well as MONDUR® 489 (modified polymeric MDI, average NCO functionality=2.9, product of Covestro). Mixtures of different polyisocyanates can be used. Dimerized and trimerized polyisocyanates can be used. In some aspects, aromatic polyisocyanates, e.g., p-MDI, are preferred.

Rigid foams can be formulated over a wide index range. As used herein, "index" means the ratio of isocyanate to hydroxyl equivalents multiplied by 100. Rigid PU foams are produced at a relatively low index, e.g., 90 to 150, while rigid PU-PIR foams are usually made at relatively high index, e.g., 180 to 350.

6. Other Foam Components

The rigid PU or PU-PIR foams can include other components, including flame retardants, pigments, fillers, reactive diluents, antioxidants, impact modifiers, and the like, and combinations thereof. Suitable flame-retardant additives include solid or liquid compounds containing phosphorus, chlorine, bromine, boron, or combinations of these elements. Examples include brominated phthalate diols, ammonium polyphosphates, tris(2-chloroisopropyl) phosphate, tetrakis (2-chloroethyl)ethylene diphosphate, tris(p-chloroethyl) phosphate, tris(2,3-dibromopropyl) phosphate, and the like. Tris(2-chloroisopropyl) phosphate is particularly preferred.

The rigid PU or PU-PIR foams can be produced using any desired technique. For lab-scale preparations, the "B-side" components (polyester polyol, fatty acid derivative, water, blowing agent, surfactant, catalysts, fire retardant) are combined and mixed well. The polyisocyanate ("A-side") is then added under rapid mixing, and the well-blended reaction mixture is poured into a suitable container or mold and cured under conditions effective to provide a closed-cell rigid foam. Pilot-scale or commercial production of rigid foams usually involves combining B-side and A-side components using machine mixing, high-pressure impingement mixing, or the like, and applying the reaction mixture to a conveyor system such as a lamination conveyor. If desired, the foams can be post-cured after production. The R-value of the foam can be determined by ASTM C-518 or other standard test methods.

We found that, particularly with pentane blowing agents, low-temperature R-values can be boosted by inclusion in the rigid foam formulation of a minor proportion of the fatty acid derivatives. As shown in Tables 1-7 below, various fatty esters, fatty amides, and PEG diesters, when included at 1 to 10 wt. % based on the amount of aromatic polyester polyol/fatty acid derivative blend, are effective in increasing the initial R-value measured at 40° F. compared with that measured at 40° F. in the absence of the fatty acid derivative. Remarkably, the values measured at 40° F. with the fatty acid derivative present usually exceed the values measured at 75° F. with the fatty acid derivative present.

In the tables below, the difference between the initial R-values measured at 40° F. and 75° F. is determined, and this value is divided by the initial R-value measured at 75° F. Multiplying the result by 100 gives the % improvement in initial R-value shown in Tables 2-6. For instance, in Table 2, the control R-values give 6.44-6.74=−0.3, then −0.3/6.74× 100=−4.5% for the loss in R-value from 75° F. to 40° F. In contrast, with 5 wt. % isopropyl myristate added, we get 7.45-6.68=0.77, then 0.77/6.68×100=+11.5% increase in R-value from 75° F. to 40° F.

The following examples merely illustrate the invention; the skilled person will recognize many variations that are within the spirit of the invention and scope of the claims.

Polyester Polyols
  STEPANPOL® PS-2352: a compatibilized aromatic polyester polyol having a nominal hydroxyl number of 240 mg KOH/g and an acid value less than 2.5 mg KOH/g (a.k.a. "Polyol A").
  Polyol B: a compatibilized aromatic mixed acid polyester polyol having a nominal hydroxyl number of 240 mg KOH/g and an acid value less than 2.5 mg KOH/g.
  Polyol C: a compatibilizer-free aromatic polyester polyol having a nominal hydroxyl number of 260 mg KOH/g and an acid value less than 2.5 mg KOH/g.

Fatty Acid Derivatives
  STEPOSOL® C-25: methyl caprate/methyl caprylate mixture ($C_8$-$C_{10}$).
  STEPOSOL® C-42: methyl laurate/methyl myristate mixture ($C_{12}$-$C_{14}$).
  STEPOSOL® C-65: methyl palmitate/methyl stearate/methyl oleate mixture ($C_{16}$-$C_{18}$).
  STEPOSOL® SB-D: soybean oil-based methyl esters.
  Isopropyl myristate.
  Isopropyl palmitate.
  HALLCOMID® M8-10: N,N-dimethyl capramide/N,N-dimethyl caprylamide mixture.
  HALLCOMID® M12-14: N,N-dimethyl lauramide/N,N-dimethyl myristamide mixture.
  PEG-400 disoyate.
  PEG-400 dioleate.
  PEG-400 dilaurate.
  (STEPOSOL® and HALLCOMID® compositions are products of Stepan Company.)

Rigid Foam Formulations
  Polyester polyol, 100 parts (by weight)
  Fatty acid derivative, 2.5 to 7.5 parts
  FYROL™ PCF, tris(2-chloroisopropyl) phosphate, ICL, 12.5 parts
  Water, 0.3 parts
  TEGOSTAB® B84506 surfactant, Evonik, 3.0 parts
  POLYCAT® 5 tertiary amine catalyst, Evonik, 0.28 parts
  NIAX™ catalyst K-ZERO G, Momentive, 3.6 parts
  POLYCAT® 46 catalyst, Evonik, 0.45 parts
  Blowing agent (C5 compound or C5 mixture), 24 parts
  MONDUR® 489, modified polymeric MDI, Covestro, 174 parts After production of the foams using a standard hand-mix technique, the foams are allowed to stand for 24 h under ambient conditions, cut, and an initial R-value is measured in accord with ASTM C-518.

TABLE 1

Effect of Fatty Acid Derivative on Rigid Foam R-Values for Foams Made using Various C5 Blowing Agents STEPANPOL® PS-2352 polyol with 0% or 5% STEPOSOL® C-42

|  | 75° F. Initial R-Value | | 40° F. Initial R-Value | |
| --- | --- | --- | --- | --- |
|  | Control | with 5% C-42 | Control | with 5% C-42 |
| n-pentane | 6.68 | 6.65 | 6.36 | 7.20 |
| 75% isopentane/ 25% n-pentane | 6.74 | 6.68 | 6.44 | 7.19 |
| isopentane | 6.77 | 6.75 | 6.74 | 7.26 |
| 70% isopentane/ 30% cyclopentane | 6.93 | 6.91 | 7.02 | 7.56 |
| 30% isopentane/ 70% cyclopentane | 7.34 | 7.34 | 7.54 | 7.50 |

The control examples in Table 1 show the drop in initial R-values when measured at 40° F. rather than 75° F. when the C5 blowing agent is n-pentane or a mixture of n-pentane and isopentane. Ideally, there is no loss in R-value at the lower temperatures. This effect is not seen with the generally more-expensive isopentane/cyclopentane blends. When 5 wt. % of STEPOSOL® C-42 fatty methyl ester is included with the aromatic polyester polyol (STEPANPOL® PS-2352), the 40° F. initial R-value is increased with any of the C5 blowing agents or combinations. Surprisingly, the boosted initial R-values at 40° F. exceed even the corresponding boosted initial R-values at 75° F.

TABLE 2

Results with 75% Isopentane/25% n-Pentane
Effect of 5% Additive with STEPANPOL® PS-2352
on Rigid Foam Initial R-Values

|  | Initial R-Value | | % improved |
| --- | --- | --- | --- |
| Additive (5 wt. %) | 75° F. | 40° F. | (75° F. to 40° F.) |
| None (control) | 6.74 | 6.44 | −4.5 |
| STEPOSOL® C-25 | 6.73 | 7.32 | +8.8 |
| STEPOSOL® C-42 | 6.68 | 7.19 | +7.6 |
| STEPOSOL® C-65 | 6.68 | 7.39 | +10.6 |
| STEPOSOL® SB-D | 6.65 | 7.23 | +8.7 |
| isopropyl myristate | 6.68 | 7.45 | +11.5 |
| isopropyl palmitate | 6.14 | 6.84 | +11.4 |
| castor oil methyl ester | 6.65 | 6.71 | +0.9 |
| sorbitan monooleate | 6.12 | 6.18 | +1.0 |
| PEG-400 disoyate | 6.76 | 7.33 | +8.4 |
| PEG-400 dioleate | 6.75 | 7.33 | +8.6 |
| PEG-400 dilaurate | 6.73 | 6.93 | +3.0 |
| HALLCOMID® M8-10 | 6.68 | 6.80 | +1.8 |
| HALLCOMID® M12-14 | 6.76 | 6.84 | +1.2 |

Table 2 compares results using various fatty acid derivatives as blended additives at 5 wt. % with STEPANPOL® PS-2352 and their impact on initial R-values of the resulting rigid foams. In each example, the C5 blowing agent is 75% isopentane/25% n-pentane. As shown in the table, the 40° F. initial R-values improve, often dramatically, with 5 wt. % of any of the listed fatty acid derivatives (fatty esters, PEG diesters, and fatty amides) when compared with the 75° F. initial R-values. Without the additive (control example), the 40° F. initial R-value decreases compared with that measured at 75° F. The ability to use C5 blowing agents while maintaining good low-temperature initial R-values gives rigid foam formulators flexibility to use a C5 blowing agent instead of a CFC, HCFC, or HFO alternative.

TABLE 3

Results with 100% Isopentane
Effect of 5% Additive with STEPANPOL® PS-2352
on Rigid Foam Initial R-Values

|  | Initial R-Value | | % improved |
| --- | --- | --- | --- |
| Additive (5 wt. %) | 75° F. | 40° F. | (75° F. to 40° F.) |
| None (control) | 6.77 | 6.74 | −0.4 |
| STEPOSOL® C-25 | 6.79 | 7.34 | +8.1 |
| STEPOSOL® C-42 | 6.75 | 7.26 | +7.6 |
| STEPOSOL® C-65 | 6.72 | 7.45 | +10.9 |
| STEPOSOL® SB-D | 6.65 | 7.29 | +9.6 |
| isopropyl myristate | 6.61 | 7.39 | +11.8 |
| isopropyl palmitate | 6.50 | 7.29 | +12.2 |
| castor oil methyl ester | 6.70 | 6.78 | +1.2 |
| sorbitan monooleate | 6.42 | 6.49 | +1.1 |
| PEG-400 disoyate | 6.85 | 7.46 | +8.9 |
| PEG-400 dioleate | 6.86 | 7.46 | +8.7 |
| PEG-400 dilaurate | 6.79 | 7.16 | +5.4 |
| HALLCOMID® M8-10 | 6.75 | 6.80 | +0.7 |
| HALLCOMID® M12-14 | 6.75 | 6.71 | −0.6 |

Table 3 compares results using various fatty acid derivatives as blended additives at 5 wt. % with STEPANPOL® PS-2352 and their impact on initial R-values of the resulting rigid foams when the blowing agent is isopentane. As shown in the table, there is not much loss in initial R-value at 40° F. in the control example. However, inclusion of 5 wt. % fatty acid derivative generally boosts the 40° F. initial R-value, in many cases, significantly.

TABLE 4

Results with 70% Isopentane/30% Cyclopentane
Effect of 5% Additive with STEPANPOL® PS-2352
on Rigid Foam Initial R-Values

|  | Initial R-Value | | % improved |
| --- | --- | --- | --- |
| Additive (5 wt. %) | 75° F. | 40° F. | (75° F. to 40° F.) |
| None (control) | 6.93 | 7.02 | +1.3 |
| STEPOSOL® C-25 | 6.95 | 7.56 | +8.8 |
| STEPOSOL® C-42 | 6.91 | 7.56 | +9.4 |
| STEPOSOL® C-65 | 7.00 | 7.60 | +8.6 |
| STEPOSOL® SB-D | 6.91 | 7.54 | +9.1 |
| isopropyl myristate | 6.91 | 7.65 | +10.7 |
| isopropyl palmitate | 6.97 | 7.68 | +10.2 |
| castor oil methyl ester | 6.94 | 7.17 | +3.3 |
| sorbitan monooleate | 6.86 | 7.09 | +3.4 |
| PEG-400 disoyate | 7.07 | 7.62 | +7.8 |
| PEG-400 dioleate | 7.05 | 7.62 | +8.1 |
| PEG-400 dilaurate | 7.06 | 7.42 | +5.1 |
| HALLCOMID® M8-10 | 7.06 | 7.34 | +4.0 |
| HALLCOMID® M12-14 | 7.00 | 7.20 | +2.9 |

Table 4 shows that similar results are again observed when the blowing agent is 70% isopentane/30% cyclopentane. There is little or no loss in initial R-value at 40° F. versus 75° F., but there is a clear improvement in the low-temperature R-values when 5 wt. % of the fatty acid derivative is included in the rigid foam formulation.

TABLE 5

Rigid Foam Initial R-Values v. Temperature
Effect of Amount of STEPOSOL® C-65 additive
with STEPANPOL® PS-2352 polyester polyol
(50% Isopentane/50% n-Pentane)

| | Amount of STEPOSOL® C-65 (wt. %) | | | |
| --- | --- | --- | --- | --- |
| | 0% (control) | 2.5% | 5.0% | 7.5% |
| Temp (° F.) | Initial R-Value | | | |
| 90 | 6.44 | 6.46 | 6.36 | 6.37 |
| 75 | 6.72 | 6.81 | 6.68 | 6.73 |
| 60 | 6.82 | 7.06 | 6.98 | 7.06 |
| 50 | 6.75 | 7.16 | 7.15 | 7.26 |
| 40 | 6.52 | 7.19 | 7.30 | 7.44 |
| 25 | 5.92 | 7.18 | 7.39 | 7.51 |
| % improved (75° F. to 40° F.) | −3.0 | +5.6 | +9.3 | +10.7 |

Table 5 and corresponding FIG. 1 show the effect of varying the amount of STEPOSOL® C-65 additive from 2.5 wt. % to 7.5 wt. % in rigid foams formulated using STEPANPOL® PS-2352 polyester polyol and 50% isopentane/50% n-pentane. The improvement in low-temperature initial R-value is significant even at 2.5 wt. % of the additive; note especially the difference between the 75° F. initial R-value and the 40° F. initial R-value for foams made with and without the additive. Values continue to rise through the 7.5 wt. % additive level.

TABLE 6

Rigid Foam Initial R-Values v. Temperature
Effect of Amount of PEG-400 Disoyate additive
with STEPANPOL ® PS-2352 polyester polyol
(50% Isopentane/50% n-Pentane)

| Temp (° F.) | Amount of PEG-400 Disoyate (wt. %) | | | |
|---|---|---|---|---|
| | 0% (control) | 2.5% | 5.0% | 7.5% |
| | Initial R-Value | | | |
| 90 | 6.44 | 6.50 | 6.43 | 6.51 |
| 75 | 6.72 | 6.85 | 6.78 | 6.85 |
| 60 | 6.82 | 7.07 | 7.11 | 7.17 |
| 50 | 6.75 | 7.13 | 7.28 | 7.34 |
| 40 | 6.52 | 7.13 | 7.41 | 7.50 |
| 25 | 5.92 | 6.93 | 7.33 | 7.52 |
| % improved (75° F. to 40° F.) | −3.0 | +4.1 | +9.3 | +9.5 |

Table 6 shows the effect of varying the amount of PEG-400 disoyate additive from 2.5 wt. % to 7.5 wt. % in rigid foams formulated using STEPANPOL® PS-2352 polyester polyol and 50% isopentane/50% n-pentane. As is the case with STEPOSOL® C-65, the improvement in low-temperature initial R-value is significant even at 2.5 wt. % of the additive, and the initial R-values increase through the 7.5 wt. % additive level. Again, note the difference between the 75° F. initial R-value and the 40° F. initial R-value for foams made with and without the additive.

TABLE 7

Rigid Foam Initial R-Values v. Temperature
5% Additive with Various Polyester Polyols
(50% Isopentane/50% n-Pentane)

| Temp (° F.) | Additive | | | | | | |
|---|---|---|---|---|---|---|---|
| | | Polyol A[1] | | Polyol B | | Polyol C | |
| | none | C-65[2] | PEG-400 DS[3] | C-65 | PEG-400 DS | C-65 | PEG-400 DS |
| | Initial R-Value | | | | | | |
| 90 | 6.44 | 6.36 | 6.43 | 6.18 | 6.41 | 6.44 | 6.54 |
| 75 | 6.72 | 6.68 | 6.78 | 6.51 | 6.72 | 6.74 | 6.89 |
| 60 | 6.82 | 6.98 | 7.11 | 6.80 | 7.06 | 7.06 | 7.20 |
| 50 | 6.75 | 7.15 | 7.28 | 6.96 | 7.18 | 7.25 | 7.39 |
| 40 | 6.52 | 7.30 | 7.41 | 7.08 | 7.28 | 7.41 | 7.50 |
| 25 | 5.92 | 7.39 | 7.33 | 7.04 | 7.18 | 7.58 | 7.35 |
| % improved (75° F. to 40° F.) | −3.0 | +9.3 | +9.3 | +8.8 | +8.3 | +9.9 | +8.9 |

[1]STEPANPOL ® PS-2352.
[2]STEPOSOL ® C-65.
[3]PEG-400 disoyate.

Table 7 shows that other polyester polyols give a similar effect when combined with the fatty acid derivatives in making a rigid foam. Polyol A is STEPANPOL® PS-2352, a compatibilized aromatic polyester polyol. Polyol B is a mixed acid compatibilized aromatic polyester polyol; Polyol C is a compatibilizer-free aromatic polyester polyol. In each case, when blended with 5 wt. % of either STEPOSOL® C-65 or a PEG-400 disoyate additive, the low-temperature initial R-values are boosted as a result of including the additive.

The preceding examples are meant only as illustrations; the following claims define the scope of the invention.

We claim:

1. A rigid PU or PU-PIR foam comprising a reaction product of water, a catalyst, a foam-stabilizing surfactant, a polyisocyanate, a blowing agent and a blend comprising:
   (a) 90 to 99 wt. % of an aromatic polyester polyol having a hydroxyl number within the range of 150 to 400 mg KOH/g; and
   (b) 1 to 10 wt. % of a fatty acid ester selected from $C_8$ to $C_{18}$ fatty acid esters or $C_8$ to $C_{18}$ fatty acid amides, the fatty acid ester being selected from methyl soyates, methyl oleates, methyl palmitates, methyl myristates, methyl laurates, ethyl soyates, isopropyl palmitates, isopropyl myristates, hexyl laurates, sorbitan monooleate, sucrose monooleate, sucrose monolaurate, sorbitan monolaurate, sorbitan monomyristate, a $C_8$-$C_{10}$ methyl caprate/methyl caprylate mixture, a $C_{12}$-$C_{14}$ methyl laurate/methyl myristate mixture, $C_{12}$ methyl laurate, a $C_{16}$-$C_{18}$ methyl palmitate/methyl stearate/methyl oleate mixture, PEG-400 dioleate, PEG-600 dioleate, PEG-400 diisostearate, PEG-400 dilaurate, PEG-400 disoyate, PEG-600 dilaurate or mixtures thereof, and
   the $C_8$ to $C_{18}$ fatty acid amide being selected from N,N-dimethyl lauramide, N,N-diethyl lauramide, N,N-dimethyl myristamide, N,N-dimethyl cocamide, N,N-dimethyl palmitamide or mixtures thereof,
   wherein the blend is an unreacted mixture of components that is clear and homogenous having a viscosity less than 5,000 cP at 25° C.

2. The PU or PU-PIR foam of claim 1 wherein the blowing agent is selected from the group consisting of n-pentane, isopentane, cyclopentane, and mixtures thereof.

3. The rigid PU or PU-PIR foam of claim 2 wherein the initial R-value of the foam measured at 40° F. meets or exceeds that measured at 75° F.

4. The rigid PU or PU-PIR foam of claim 2 wherein the difference between initial R-values of the foam measured at 75° F. and 40° F. is at least 5% greater than that of a similar foam prepared in the absence of the fatty acid derivative.

5. An insulation board for a roof or wall application comprising the rigid PU-PIR foam of claim 1.

6. The rigid PU or PU-PIR foam of claim 1 wherein the aromatic polyester polyol has a hydroxyl number within the range of 160 to 350 mg KOH/g.

7. The rigid PU or PU-PIR foam of claim 6 wherein the aromatic polyester polyol has a hydroxyl number within the range of 200 to 300 mg KOH/g.

8. The rigid PU or PU-PIR foam of claim 1 wherein the aromatic polyester polyol is partially transesterified with up to 20 wt. %, based on the amount of aromatic polyester polyol, of a hydrophobe.

9. The rigid PU or PU-PIR foam of claim 1 further comprising 0.5 to 15 wt. %, based on the amount of aromatic polyester polyol, of a nonionic alkoxylated surfactant.

10. The rigid PU or PU-PIR foam of claim 1 wherein the aromatic polyester polyol has recurring units from one or more phthalate-based compounds or compositions and one or more glycols.

11. The rigid PU or PU-PIR foam of claim 1 wherein the aromatic polyester polyol has recurring units from phthalic anhydride and diethylene glycol.

12. The rigid PU or PU-PIR foam of claim 1 comprising 92 to 98 wt. % of the aromatic polyester polyol and 2 to 8 wt. % of the fatty acid derivative.

13. The rigid PU or PU-PIR foam of claim 1 wherein the blend further comprises a polyol selected from the group consisting of thioether polyols; polyester amides, polyacetals, and aliphatic polycarbonates containing hydroxyl groups; amine-terminated polyethers; amine-initiated polyols; polyether polyols; Mannich polyols; non-aromatic polyester polyols; graft dispersion polyols; polyetherester polyols; and mixtures thereof.

* * * * *